United States Patent
Patel

(10) Patent No.: US 6,370,051 B1
(45) Date of Patent: Apr. 9, 2002

(54) FORWARD CONVERTER CIRCUIT HAVING REDUCED SWITCHING LOSSES

(75) Inventor: Amrit P. Patel, Camarillo, CA (US)

(73) Assignee: Power-One, Inc., Camarillo, CA (US)

( * ) Notice: Subject to any disclaimer, the term of this patent is extended or adjusted under 35 U.S.C. 154(b) by 0 days.

(21) Appl. No.: 09/706,407

(22) Filed: Nov. 3, 2000

Related U.S. Application Data

(60) Provisional application No. 60/164,026, filed on Nov. 5, 1999.

(51) Int. Cl.[7] ............... H02M 7/5387; H02M 3/335
(52) U.S. Cl. ..................... 363/132; 363/17; 363/40
(58) Field of Search ........................ 363/132, 127, 363/17, 20, 16, 56, 37, 40, 41, 39, 65

(56) References Cited

U.S. PATENT DOCUMENTS

| | | | |
|---|---|---|---|
| 4,301,496 A | * 11/1981 | Schwarz ................. 363/17 |
| 4,864,479 A | * 9/1989 | Steigerwald et al. ....... 363/17 |
| 4,959,764 A | 9/1990 | Bassett |
| 5,066,900 A | 11/1991 | Bassett |
| 5,132,889 A | 7/1992 | Hitchcock et al. |
| 5,140,512 A | 8/1992 | O'Sullivan |
| 5,173,846 A | 12/1992 | Smith |
| 5,291,382 A | 3/1994 | Cohen |
| 5,331,533 A | 7/1994 | Smith |
| 5,402,329 A | 3/1995 | Wittenbreder, Jr. |
| 5,412,555 A | 5/1995 | Uramoto |
| 5,684,683 A | * 11/1997 | Divan et al. ............. 363/132 |
| 5,748,457 A | 5/1998 | Poon et al. |
| 5,774,346 A | 6/1998 | Poon et al. |
| 5,793,191 A | 8/1998 | Elmore et al. |
| 5,886,881 A | 3/1999 | Xia et al. |
| 5,946,200 A | 8/1999 | Kim et al. |

FOREIGN PATENT DOCUMENTS

| | | |
|---|---|---|
| EP | 0 880 220 A2 | 11/1998 |
| EP | 1 069 675 A1 | 1/2001 |

* cited by examiner

*Primary Examiner*—Rajnikant B. Patel
(74) *Attorney, Agent, or Firm*—O'Melveny & Myers LLP

(57) ABSTRACT

A forward converter circuit has substantially reduced switching losses to provide greater efficiency than the aforementioned conventional circuit. A first switch is coupled to a primary winding of a transformer and adapted to selectively couple a bus voltage terminal to a first terminal of the primary winding. A second switch is coupled to the transformer and adapted to selectively couple a second terminal of the primary winding to ground. The first and second switches are triggered in response to a first periodic gate control signal. A diode is coupled between the bus voltage terminal and the second terminal of the primary winding of the transformer. A third switch is coupled to the transformer and adapted to selectively couple the first terminal of the primary winding of the transformer to ground. The third switch is triggered in response to a second periodic gate control signal. The second periodic gate control signal is substantially inverted with respect to the first periodic gate control signal. A capacitor is coupled in parallel with the second switch. Power from the bus voltage terminal is transferred from the primary winding to the secondary winding of the transformer during a portion of an operational cycle of the forward converter circuit with the first and second switches being in a conductive state responsive to the first periodic gate control signal.

20 Claims, 3 Drawing Sheets

FIG. 1
PRIOR ART
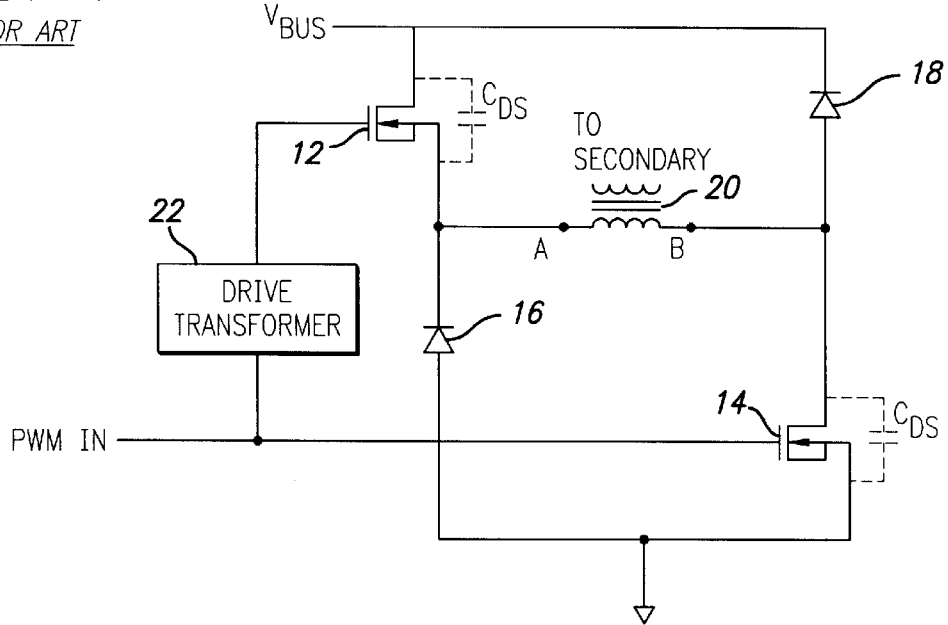
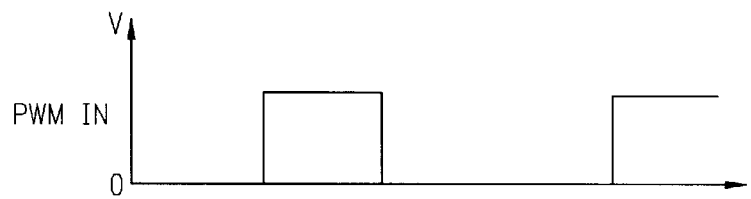
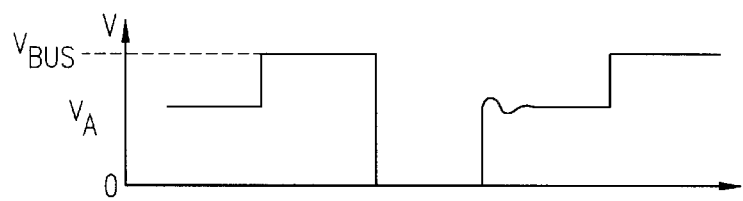
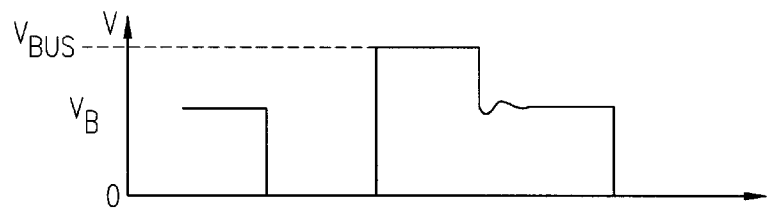
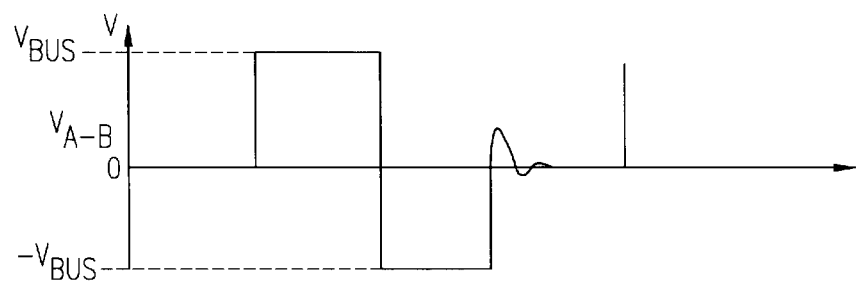
FIG. 2
PRIOR ART

US 6,370,051 B1

FORWARD CONVERTER CIRCUIT HAVING REDUCED SWITCHING LOSSES

RELATED APPLICATION DATA

This application claims priority pursuant to 35 U.S.C. § 119(e) to provisional patent application Ser. No. 60/164,026, filed Nov. 5, 1999, the subject matter of which is incorporated by reference herein in its entirety.

BACKGROUND OF THE INVENTION

1. Field of the Invention

The present invention relates to DC-to-DC power converter circuits, and more particularly, to a two-switch forward converter circuit that provides substantially reduced switching losses by setting the voltage across the main switches to zero prior to their respective conduction states.

2. Description of Related Art

Two-switch forward converter circuits are known in the art for providing a relatively high DC voltage pulse modulated source on a primary side of a transformer of a DC-to-DC power converter circuit. An example of a conventional two-switch forward converter circuit is provided in FIG. 1. The two-switch forward converter circuit derives its name from two MOSFET switches 12, 14 that are used to periodically switch the bus voltage ($V_{BUS}$) across the primary side of a transformer 20. The bus voltage ($V_{BUS}$) is typically a relatively high DC level, such as 380 volts.

As shown in FIG. 1, the first switch 12 has a drain terminal coupled to $V_{BUS}$ and a source terminal coupled to a first end (A) of the primary winding of the transformer 20. The second switch 14 has a source terminal coupled to ground and a drain terminal coupled to a second end (B) of the primary winding of the transformer 20. The first end (A) of the transformer 20 is coupled to ground through a diode 16 and the second end (B) of the transformer is coupled to $V_{BUS}$ through a diode 18. The gate terminals of the first and second switches 12, 14 are driven by a pulse width modulator input signal (PWM IN). The gate terminal of the first switch 12 is driven through a drive transformer 22 in order to float the source voltage with respect to ground. The gate terminal of the second switch 18 is driven directly by PWM IN. It should be appreciated that each of the switches 12, 14 includes an internal body diode and a body capacitor ($C_{DS}$) defined between drain and source terminals thereof.

The operation of the two-switch forward converter circuit of FIG. 1 is illustrated with respect to the timing diagrams of FIG. 2. In FIG. 2, the PWM IN signal is illustrated as a series of rectangular pulses having a predetermined duty cycle. In the time prior to issuance of a first pulse, the forward converter circuit is in a steady-state condition in which both switches 12, 14 are off (i.e., non-conducting). The voltages at end A of the transformer ($V_A$) and at end B of the transformer ($V_B$) have equalized at roughly half of the bus voltage ($V_{BUS}$), so the voltage across the transformer ($V_{A-B}$) is zero. The body capacitors $C_{DS}$ of each of the switches 12, 14 are charged. When the PWM IN signal goes from low to high, both switches 12, 14 are turned on, causing $V_A$ to rise to $V_{BUS}$ and $V_B$ to fall to ground so that the full bus voltage $V_{BUS}$ is across the transformer 20. This causes current to flow through both switches 12, 14 and through the primary winding of the transformer 20 to deliver power to the secondary winding of the transformer. In this state, the voltage across the transformer 20 is the bus voltage $V_{BUS}$.

When the PWM IN signal goes from high to low, both switches 12, 14 are turned off. The leakage and magnetization current in the transformer 20 starts to charge the body capacitors $C_{DS}$ of each of the switches 12, 14. This causes $V_A$ to fall to ground and $V_B$ to rise to $V_{BUS}$ so that the negative bus voltage $-V_{BUS}$ is across the transformer 20. When the voltage across the switches 12, 14 reaches $V_{BUS}$, magnetization current starts to flow through the diodes 16, 18, and the transformer 20 starts resetting by dumping magnetization energy back to the bus. After a period of time, the transformer 20 has zero magnetization current and the current through the diodes 16, 18 drops to zero, and the forward converter circuit returns to the steady-state condition described above. Some ringing generally occurs as the voltage across the transformer 20 returns to zero, as depicted in FIG. 2.

A significant drawback of the two-switch forward converter circuit is that it is inefficient for three reasons. First, the stored charge in the body capacitors $C_{DS}$ of each of the switches 12, 14 is lost when the switches are turned on. Even if the switches were turned on with zero current, there is loss of efficiency due to the discharge of the body capacitors $C_{DS}$. Second, the switches 12, 14 have transition power loss when they change state since there is voltage between the drain and source terminals and current flowing between the drain and source terminals during the transition period. The transition current and voltage causes a power surge in the device. Third, there is resistive loss of the switches 12, 14 due to the drain-to-source resistance ($R_{DS}$) of the MOSFETs. While this third inefficiency can be minimized by selecting MOSFETs having low drain-to-source resistance $R_{DS}$, it cannot be entirely eliminated. If the switches 12, 14 could be adapted to change state with zero voltage and zero current, a substantial improvement in efficiency of the two-switch forward converter circuit could be attained.

Accordingly, it would be desirable to provide a two-switch forward converter circuit having substantially reduced switching losses to provide greater efficiency than the aforementioned conventional circuit. More specifically, it would be desirable to provide a two-switch forward converter circuit having switches that change state with substantially zero voltage and zero current.

SUMMARY OF THE INVENTION

The present invention is directed to a forward converter circuit having substantially reduced switching losses to provide greater efficiency than the aforementioned conventional circuit. The forward converter circuit is similar to the conventional circuit in that it includes a transformer having primary and secondary windings, and two switches used to couple the primary windings to bus voltage and ground, respectively. Unlike the conventional circuit, however, the present invention further includes a third switch adapted to increase the rate of removal of magnetization current from the transformer in between operational cycles so as to reduce the switching losses of the two primary switches.

In an embodiment of the invention, a first switch is coupled to a primary winding of a transformer and adapted to selectively couple a bus voltage terminal to a first terminal of the primary winding. A second switch is coupled to the transformer and adapted to selectively couple a second terminal of the primary winding to ground. The first and second switches are triggered in response to a first periodic gate control signal. A diode is coupled between the bus voltage terminal and the second terminal of the primary winding of the transformer. A third switch is coupled to the transformer and adapted to selectively couple the first terminal of the primary winding of the transformer to ground.

The third switch is triggered in response to a second periodic gate control signal. The second periodic gate control signal is substantially inverted with respect to the first periodic gate control signal. A capacitor is coupled in parallel with the second switch. Power from the bus voltage terminal is transferred from the primary winding to the secondary winding of the transformer during a portion of an operational cycle of the forward converter circuit with the first and second switches being in a conductive state responsive to the first periodic gate control signal.

More specifically, the first periodic gate control signal further comprises a rectangular waveform having a predetermined duty cycle. The second periodic gate control signal further comprising a rectangular waveform having an inverted duty cycle with respect to the predetermined duty cycle of the first periodic gate control signal. A first time delay period is defined between a trailing edge of the second periodic gate control signal and a leading edge of the first periodic gate control signal. A second time delay period is defined between a trailing edge of the first periodic gate control signal and a leading edge of the second periodic gate control signal.

A more complete understanding of the forward converter circuit having reduced switching losses will be afforded to those skilled in the art, as well as a realization of additional advantages and objects thereof, by a consideration of the following detailed description of the preferred embodiment. Reference will be made to the appended sheets of drawings, which will be first described briefly.

BRIEF DESCRIPTION OF THE DRAWINGS

FIG. 1 is a schematic drawing of a prior art two-switch forward converter circuit;

FIG. 2 illustrates timing diagrams of various voltage levels within the prior art two-switch forward converter circuit;

DETAILED DESCRIPTION OF THE PREFERRED EMBODIMENT

The present invention satisfies the need for a two-switch forward converter circuit having substantially reduced switching losses to provide improved efficiency over the conventional forward converter circuits. In the detailed description that follows, like element numerals are used to describe like elements illustrated in one or more of the figures.

Figure 3:
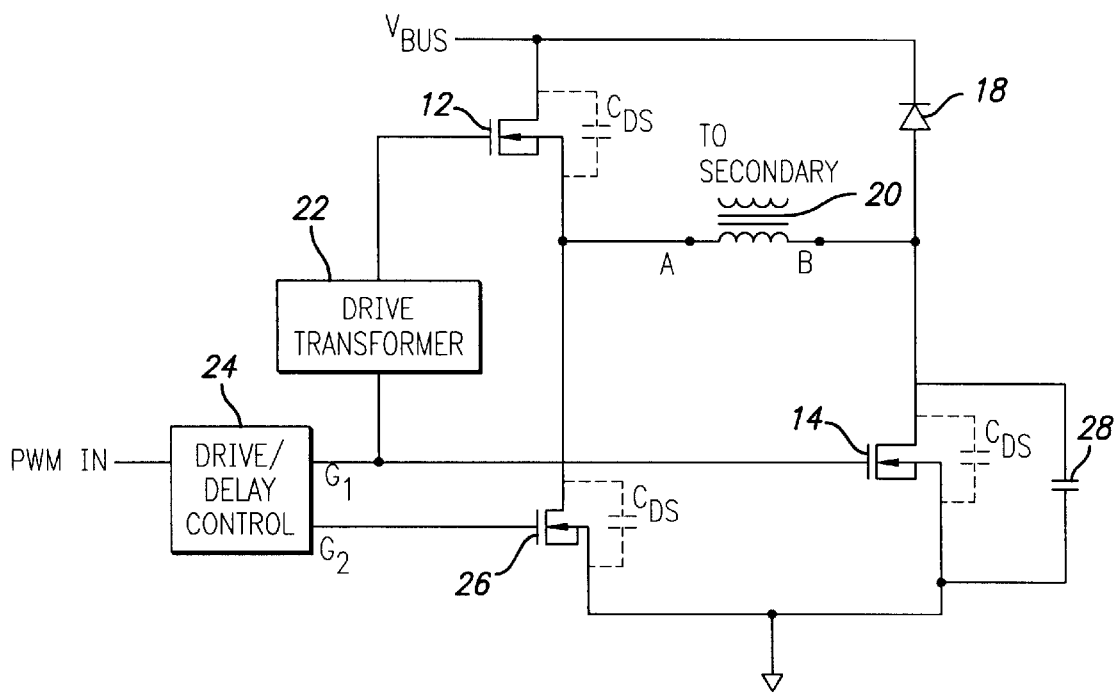
FIG. 3 is a schematic drawing of a two-switch forward converter circuit in accordance with the present invention.

Referring now to FIG. 3, a two-switch forward converter circuit constructed in accordance with the present invention is illustrated. The two-switch forward converter circuit differs from the prior art circuit in that the diode 16 is replaced with a third switch 26. Since the third switch 26 contains an internal body diode, it provides the function of the diode 16 when the switch is turned off. In addition, the two-switch forward converter circuit includes a capacitor 28 coupled between the source and drain terminals of the second switch 14. Lastly, a programmable drive/delay circuit 24 is provided that receives the pulse width modulated input PWM IN and provides two gate drive outputs $G_1$, $G_2$. The first gate drive output $G_1$ drives the gate terminals of the first and second switches 12, 14 in the same manner as the PWM IN of the prior art circuit of FIG. 1. The second gate drive output $G_2$ drives the gate terminal of the third switch 26.

Figure 4:
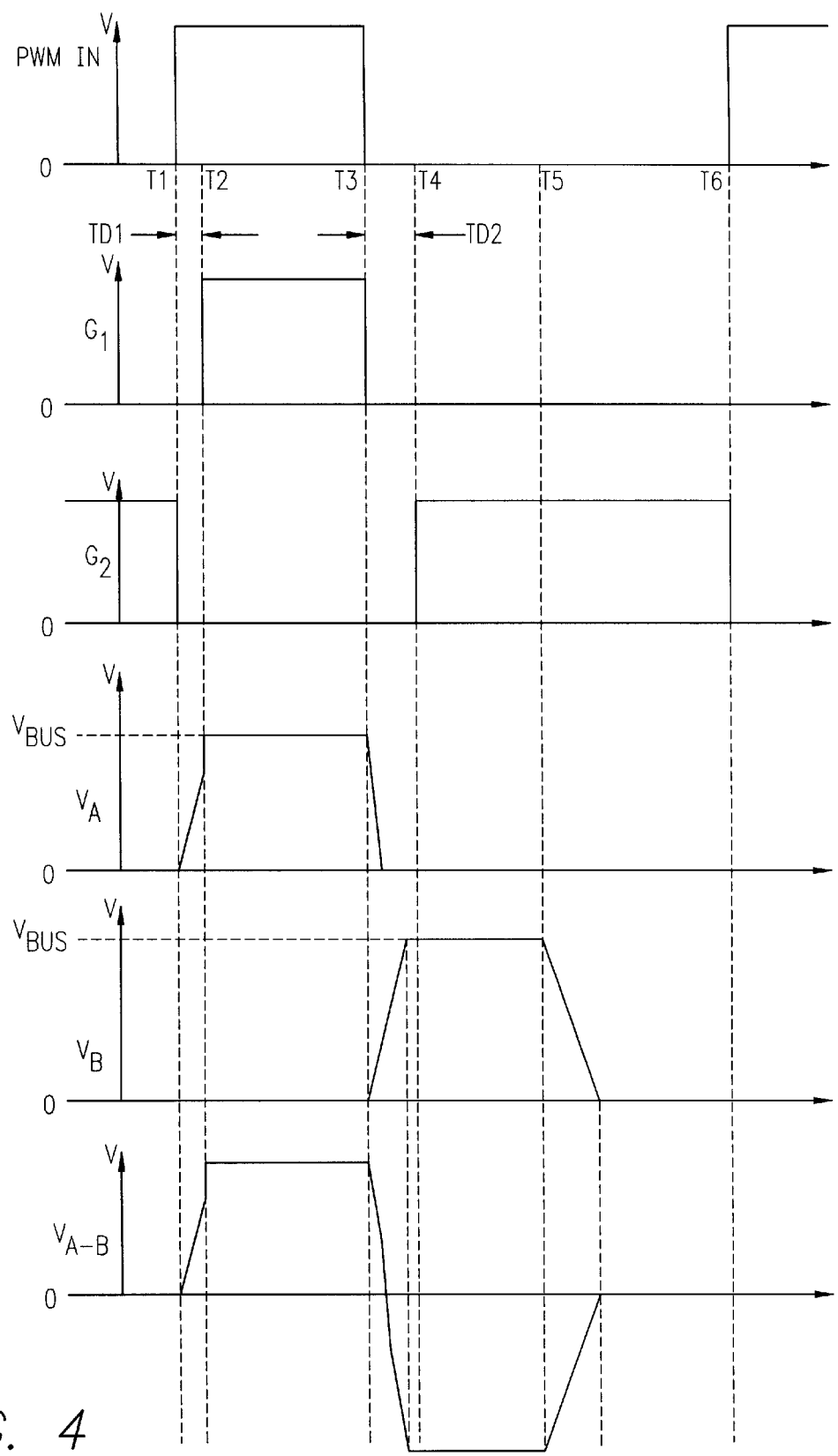
FIG. 4 illustrates timing diagrams of various voltage levels within the two-switch forward converter circuit of FIG. 3.

The operation of the two-switch forward converter circuit of FIG. 3 is illustrated with respect to the timing diagrams of FIG. 4. In FIG. 4, the PWM IN signal is illustrated as a series of rectangular pulses having a predetermined duty cycle with a pulse rising from low to high at time $T_1$ and falling from high to low at time $T_3$. The first gate drive output $G_1$ rises from low to high at time $T_2$, following a time delay $TD_1$ after time $T_1$. The first gate drive output $G_1$ then falls from high to low at time $T_3$, along with the PWM IN signal. The second gate drive output $G_2$ has an inverted duty cycle with respect to the PWM IN signal, and falls from high to low at time $T_1$ and rises from low to high at time $T_4$, following a time delay $TD_2$ after time $T_3$.

In the time prior to $T_1$, the third switch 26 is turned on and the first and second switches 12, 14 are turned off. Circulating current is flowing through the primary winding of the transformer 20, through the third switch 26, and through the body diode of the second switch 14. The voltage between the drain and source terminals of the first switch 12 is equal to the full bus voltage $V_{BUS}$, and the body capacitor $C_{DS}$ of the first switch 12 is charged. The voltage between the drain and source terminals of the second and third switches 14, 26 is zero. At time $T_1$, the second gate drive output $G_2$ falls from high to low, causing the third switch 26 to shut off. Since the first gate drive output $G_1$ is still low, the first and second switches 12, 14 are still off. The circulating current stops flowing from the drain terminal of the third switch 26. This causes the body capacitor $C_{DS}$ of the third switch 26 to charge and the body capacitor $C_{DS}$ of the first switch 12 to discharge. Circulating current is still flowing through the transformer 20 and through the body diode of the second switch 14.

As shown in FIG. 4, the voltage $V_A$ rises during the time delay $TD_1$ between times $T_1$ and $T_2$, reflecting the charge building in the body capacitor $C_{DS}$ of the third switch 26 although the voltage $V_A$ does not rise all the way to $V_{BUS}$. One way to achieve this transition is by the transformer 20 presenting a high impedance when a low level of current is flowing through the transformer 20, such as by including a saturable reactor on the secondary side of the transformer 20. A saturable reactor may comprise a ferrite bead that is included in the secondary winding of the transformer 20. The ferrite bead will present a high impedance, and then quickly become saturated by current flowing therethrough causing the impedance to drop. The initial high impedance causes the body capacitor $C_{DS}$ of the third switch 26 to charge quickly. Another way to quickly build the charge in the body capacitor $C_{DS}$ of the third switch 26 is to include a leakage inductor in series with the transformer 20.

At time $T_2$, the first gate drive output $G_1$ rises from low to high, and switches 12, 14 are turned on. This causes $V_A$ to rise to $V_{BUS}$. Since $V_B$ was already at ground, the full bus voltage $V_{BUS}$ is across the transformer and current flows through the channel of both switches 12, 14 and through the primary winding of the transformer 20 to deliver power to the secondary winding. As in the prior art circuit, the voltage across the transformer 20 is at the full bus voltage $V_{BUS}$. Notably, the second switch 14 turns on at time $T_2$ from a zero voltage state, and therefore does not have any switching or body capacitance loss. Since the first switch 12 turns on from a voltage that is less than $V_{BUS}$ due to the discharge of its body capacitor $C_{DS}$, but not zero, it does have some switching and body capacitance loss. Nevertheless, this loss is much less than the loss that occurs in the prior art forward converter circuit described above.

At time $T_3$, the first gate drive output $G_1$ falls from high to low, and switches 12, 14 are turned off. The third switch 26 is still turned off. The leakage and magnetization current in the transformer 20 starts to charge capacitor 28 coupled across the second switch 14 and the body capacitor $C_{DS}$ of first switch 12. This causes $V_A$ to drop back to ground and $V_B$ to rise back to $V_{BUS}$ during the time delay $TD_2$ between times $T_3$ and $T_4$, as shown in FIG. 4. Because the drain current of the second switch 14 is diverted to the capacitor 28, the turn off loss of the second switch 14 during the transition from on to off is eliminated. When the voltage across the third switch 26, i.e., $V_A$, reaches zero, magnetization current starts to flow through the body diode of the third switch 26. Similarly, when the voltage across the second switch 14, i.e., $V_B$, reaches $V_{BUS}$, magnetization current starts to flow through the diode 18. Once the body diode of the third switch 26 and the diode 18 are conducting, the transformer 20 starts resetting by dumping magnetization energy back to the bus.

At time $T_4$, after the time delay $TD_2$, the second gate drive output $G_2$ rises from low to high and the third switch 26 is turned on. Since there is no voltage across the third switch 26 when it transitions from off to on, there is no switching or body capacitance loss. Between times $T_4$ and $T_5$, the transformer 20 is continuing to reset by dumping magnetization current through the diode 18 and through the third switch 26. Eventually, at time $T_5$, the transformer 20 has zero magnetization current and the current through the diode 18 and the third switch 26 goes to zero. Then, the capacitor 28 starts to discharge through the transformer 20 since the third switch 26 is on, and the direction of current flow through the third switch 26 reverses. As the capacitor 28 discharges, the voltage $V_B$ drops to ground as shown in FIG. 4. Thereafter, circulating current again flows through the transformer 20, through the body diode of the second switch 14, and through the third switch 26. At time $T_6$, the forward converter circuit has returned to the condition it was in at time $T_1$, and the cycle repeats.

Having thus described a preferred embodiment of a forward converter circuit having reduced switching losses, it should be apparent to those skilled in the art that certain advantages of the described system have been achieved. It should also be appreciated that various modifications, adaptations, and alternative embodiments thereof may be made within the scope and spirit of the present invention. The invention is defined by the following claims.

What is claimed is:

1. A forward converter circuit, comprising:
   a transformer having a primary winding and a secondary winding;
   a first switch coupled to said transformer and adapted to selectively couple a bus voltage terminal to a first terminal of said primary winding of said transformer, said first switch including an internal capacitor;
   a second switch coupled to said transformer and adapted to selectively couple a second terminal of said primary winding of said transformer to ground, said first switch including an internal capacitor, said first and second switches triggering in response to a first periodic gate control signal;
   a diode coupled between said bus voltage terminal and said second terminal of said primary winding of said transformer;
   a third switch coupled to said transformer and adapted to selectively couple said first terminal of said primary winding of said transformer to ground, said third switch including an internal capacitor, said third switch triggering in response to a second periodic gate control signal to increase a removal rate of magnetization current from said transformer, said second periodic gate control signal being substantially inverted with respect to said first periodic gate control signal; and
   a capacitor coupled in parallel with said second switch in addition to said internal capacitor of said second switch;
   wherein, power from said bus voltage terminal is transferred from said primary winding to said secondary winding of said transformer during a portion of an operational cycle of said forward converter circuit with said first and second switches in a conductive state, and at least said second and third switches change between non-conductive and conductive states at substantially zero voltage and zero current conditions.

2. The forward converter circuit of claim 1, wherein said magnetization current of said transformer charges said capacitor following said portion of said operational cycle to eliminate turn off loss of said second switch.

3. The forward converter circuit of claim 2, wherein said magnetization current is further conducted through said third switch and said diode with said third switch in said non-conductive state.

4. The forward converter circuit of claim 1, further comprising means for generating said first and second periodic gate control signals, said first periodic gate control signal further comprising a rectangular waveform having a predetermined duty cycle, said second periodic gate control signal further comprising a rectangular waveform having an inverted duty cycle with respect to said predetermined duty cycle of said first periodic gate control signal.

5. The forward converter circuit of claim 4, wherein a first time delay period is defined between a trailing edge of said second periodic gate control signal and a leading edge of said first periodic gate control signal, and a second time delay period is defined between a trailing edge of said first periodic gate control signal and a leading edge of said second periodic gate control signal.

6. The forward converter circuit of claim 1, wherein said first, second and third switches each further comprise MOSFET devices.

7. The forward converter circuit of claim 1, further comprising a saturable reactor coupled to said secondary winding of said transformer, said saturable reactor presenting an initially high impedance causing said internal capacitor of said third switch to charge quickly.

8. The forward converter circuit of claim 1, wherein a delay period is defined between respective positive portions of said first and second periodic gate control signals.

9. The forward converter circuit of claim 8, wherein voltage between said first terminal of said primary winding and ground drops to zero during said delay period.

10. The forward converter circuit of claim 8, wherein voltage between said second terminal of said primary winding and ground rises to bus voltage during said delay period.

11. A forward converter circuit, comprising:
    a transformer having a primary winding and a secondary winding;
    first switching means for selectively coupling a bus voltage terminal to a first terminal of said primary winding of said transformer;
    second switching means for selectively coupling a second terminal of said primary winding of said transformer to ground, said first and second switching means being responsive to a first periodic gate control signal;

a diode coupled between said bus voltage terminal and said second terminal of said primary winding of said transformer;

third switching means for selectively coupling said first terminal of said primary winding of said transformer to ground to increase a removal rate of magnetization current from said transformer, said third switching means being responsive to a second periodic gate control signal, said second periodic gate control signal being substantially inverted with respect to said first periodic gate control signal; and a capacitor coupled in parallel with said second switch in addition to said internal capacitor of said second switch;

wherein, power from said bus voltage terminal is transferred from said primary winding to said secondary winding of said transformer during a portion of an operational cycle of said forward converter circuit with said first and second switching means in a conductive state.

12. The forward converter circuit of claim 11, wherein said magnetization current of said transformer charges said capacitor following said portion of said operational cycle to eliminate turn off loss of said second switching means.

13. The forward converter circuit of claim 12, wherein said magnetization current is further conducted through said third switching means and said diode with said third switching means in said non-conductive state.

14. The forward converter circuit of claim 11, further comprising means for generating said first and second periodic gate control signals, said first periodic gate control signal further comprising a rectangular waveform having a predetermined duty cycle, said second periodic gate control signal further comprising a rectangular waveform having an inverted duty cycle with respect to said predetermined duty cycle of said first periodic gate control signal.

15. The forward converter circuit of claim 14, wherein a first time delay period is defined between a trailing edge of said second periodic gate control signal and a leading edge of said first periodic gate control signal, and a second time delay period is defined between a trailing edge of said first periodic gate control signal and a leading edge of said second periodic gate control signal.

16. The forward converter circuit of claim 11, wherein at least one of said first, second and third switching means comprises a MOSFET device.

17. The forward converter circuit of claim 11, further comprising a saturable reactor coupled to said secondary winding of said transformer.

18. The forward converter circuit of claim 11, wherein a delay period is defined between respective positive portions of said first and second periodic gate control signals.

19. The forward converter circuit of claim 18, wherein voltage between said first terminal of said primary winding and ground drops to zero during said delay period.

20. The forward converter circuit of claim 18, wherein voltage between said second terminal of said primary winding and ground rises to bus voltage during said delay period.

* * * * *